US007984203B2

(12) United States Patent
Madukkarumukumana et al.

(10) Patent No.: US 7,984,203 B2
(45) Date of Patent: *Jul. 19, 2011

(54) ADDRESS WINDOW SUPPORT FOR DIRECT MEMORY ACCESS TRANSLATION

(75) Inventors: Rajesh Madukkarumukumana, Portland, OR (US); Udo A. Steinburg, Sohland a.d. Spree (DE); Steven M. Bennett, Hillsboro, OR (US); Andrew V. Anderson, Hillsboro, OR (US); Gilbert Neiger, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/648,461

(22) Filed: Dec. 29, 2009

(65) Prior Publication Data

US 2010/0100648 A1   Apr. 22, 2010

Related U.S. Application Data

(63) Continuation of application No. 11/157,675, filed on Jun. 21, 2005, now abandoned.

(51) Int. Cl.
*G06F 12/02* (2006.01)
(52) U.S. Cl. .............. 710/22; 710/28; 718/100
(58) Field of Classification Search .................. None
See application file for complete search history.

(56) References Cited

U.S. PATENT DOCUMENTS

| 5,522,075 | A | 5/1996 | Robinson et al. |
| 5,890,220 | A | 3/1999 | Mochida |
| 6,128,684 | A | 10/2000 | Okayama |
| 6,339,803 | B1 * | 1/2002 | Glassen et al. ................. 710/52 |
| 6,549,959 | B1 * | 4/2003 | Yates et al. ...................... 710/22 |
| 6,665,759 | B2 * | 12/2003 | Dawkins et al. ............... 710/200 |
| 6,678,825 | B1 * | 1/2004 | Ellison et al. .................. 726/17 |
| 6,725,284 | B2 | 4/2004 | Arndt |
| 6,804,741 | B2 | 10/2004 | Cowan |
| 6,820,207 | B2 | 11/2004 | Dawkins et al. |
| 6,839,892 | B2 | 1/2005 | Dawkins et al. |
| 6,895,491 | B2 * | 5/2005 | Kjos et al. ..................... 711/203 |
| 6,907,600 | B2 * | 6/2005 | Neiger et al. ................. 717/139 |
| 6,941,436 | B2 | 9/2005 | Lee et al. |
| 6,986,006 | B2 | 1/2006 | Willman et al. |
| 7,058,768 | B2 * | 6/2006 | Willman et al. ............... 711/154 |
| 7,069,413 | B1 * | 6/2006 | Agesen et al. ................. 711/207 |
| 7,089,377 | B1 | 8/2006 | Chen |

(Continued)

FOREIGN PATENT DOCUMENTS

DE    112005002304    9/2007

(Continued)

OTHER PUBLICATIONS

Non-final Office Action mailed Jan. 7, 2008 for U.S. Appl. No. 11/157,675.

(Continued)

*Primary Examiner* — Cheng-Yuan Tseng
(74) *Attorney, Agent, or Firm* — Blakely, Sokoloff, Taylor & Zafman LLP

(57) ABSTRACT

An apparatus is disclosed. The apparatus includes a remapping circuit to facilitate access of one or more I/O devices to a memory device for direct memory access (DMA) transactions. The remapping circuit of the apparatus includes a translation mechanism to perform memory address translations for I/O DMA transactions via address window-based translations.

8 Claims, 11 Drawing Sheets

U.S. PATENT DOCUMENTS

| | | |
|---|---|---|
| 7,103,808 B2 | 9/2006 | Kittamorn et al. |
| 7,111,145 B1 | 9/2006 | Chen et al. |
| 7,114,056 B2 | 9/2006 | Tremblay et al. |
| 7,117,342 B2 | 10/2006 | Tremblay et al. |
| 7,117,385 B2 | 10/2006 | Chokshi et al. |
| 7,158,972 B2 | 1/2007 | Marsland |
| 7,225,287 B2 * | 5/2007 | Wooten .................. 710/309 |
| 7,266,631 B2 | 9/2007 | Arndt |
| 7,308,551 B2 | 12/2007 | Arndt et al. |
| 7,334,107 B2 * | 2/2008 | Schoinas et al. .......... 711/207 |
| 7,340,582 B2 * | 3/2008 | Madukkarumukumana et al. ................. 711/202 |
| 7,353,360 B1 | 4/2008 | Muller et al. |
| 7,415,035 B1 | 8/2008 | Muller et al. |
| 7,444,493 B2 * | 10/2008 | Schoinas et al. .......... 711/206 |
| 7,467,381 B2 * | 12/2008 | Madukkarumukumana et al. ................. 718/1 |
| 7,900,017 B2 * | 3/2011 | Hall et al. .................. 711/207 |
| 2001/0042190 A1 | 11/2001 | Tremblay et al. |
| 2001/0052063 A1 | 12/2001 | Tremblay et al. |
| 2002/0103889 A1 | 8/2002 | Markson et al. |
| 2002/0108025 A1 | 8/2002 | Shaylor |
| 2003/0110173 A1 | 6/2003 | Marsland |
| 2004/0064668 A1 | 4/2004 | Kjos et al. |
| 2004/0098544 A1 | 5/2004 | Gaither et al. |
| 2004/0205393 A1 | 10/2004 | Kitamorn et al. |
| 2005/0039180 A1 | 2/2005 | Fultheim et al. |
| 2005/0132365 A1 * | 6/2005 | Madukkarumukumana et al. ................. 718/1 |
| 2006/0010276 A1 | 1/2006 | Arndt et al. |
| 2006/0010355 A1 | 1/2006 | Arndt et al. |
| 2006/0039180 A1 | 2/2006 | Kawasumi |
| 2006/0069899 A1 | 3/2006 | Schoinas et al. |
| 2006/0075146 A1 * | 4/2006 | Schoinas et al. .................. 710/3 |
| 2006/0123416 A1 | 6/2006 | Bertolotti et al. |
| 2006/0143311 A1 * | 6/2006 | Madukkarumukumana et al. ................. 710/1 |
| 2006/0206658 A1 | 9/2006 | Hendel et al. |
| 2006/0206687 A1 | 9/2006 | Vega |
| 2007/0067435 A1 | 3/2007 | Landis et al. |

FOREIGN PATENT DOCUMENTS

| | | |
|---|---|---|
| EP | 1508855 | 2/2005 |
| WO | WO-2006039051 | 4/2006 |

OTHER PUBLICATIONS

Final Office Action mailed Mar. 2, 2009 for U.S. Appl. No. 11/157,675.
Final Office Action mailed Jun. 8, 2009 for U.S. Appl. No. 11/157,675.
Non-final Office Action mailed Sep. 23, 2009 for U.S. Appl. No. 11/157,675.
Final Office Action mailed Apr. 14, 2010 for U.S. Appl. No. 11/157,675.
International Search Report and Written Opinion mailed Oct. 4, 2006 for PCT Application No. PCT/US2006/024515.
International Preliminary Report on Patentability mailed Jan. 10, 2008 for PCT Application No. PCT/US2006/024515.
First Office Action mailed Dec. 19, 2008 for Chinese Office Application No. 200680022186.4 (PCT/US2006/024515).
Second Office Action mailed Jul. 3, 2009 for Chinese Office Application No. 200680022186.4 (PCT/US2006/024515).
Non-Final Office Action mailed Oct. 31, 2008 for German Patent Application No. 11 2006 001 642.3-53.
Non-Final Office Action mailed Feb. 2, 2010 for German Patent Application No. 11 2006 001 642.3-53.
Examination Report mailed Jan. 21, 2010 for GB Patent Application No. 0722953.7.
Notice of Last Preliminary Rejection mailed Apr. 29, 2010 for Korean Patent Application No. 10-2007-7029979.
KR OA Aug. 29, 2009, Notice of Preliminary Rejection for Korean Patent Application No. 10-2007-7029979.
Sirer et al., Design and Implementation of a Distributed Virtual Machine for Networked Computers, ACM, 1999, pp. 202-216.
Gibson, G. A. et al. Strategic Directions in Storage I/O Issues in Large-Scale Computing, ACM Computing Survey vol. 28, Issue 4, Dec. 1996, 15 pages.

\* cited by examiner

| Abbreviation | AW_FLUSH_REGx |
| --- | --- |
| General Description | Register to flush a slot from the address window cache |
| Register Offset | XXh |

| Bits | Access | Default | Field | Description |
| --- | --- | --- | --- | --- |
| 15 : 9 | RO | 0h | Reserved | Reserved. Reads return 0. Writes are ignored |
| 8 : 0 | RW | 0h | SN: Slot Number | The slot number identifies the 4KB DPA region (within the AW corresponding to this register) whose DPA-to-HPA translation need to be flushed. The slot number may be derived by the entity writing to this register from the DPA as SN = DPA[20:12]. |

FIG. 10

ADDRESS WINDOW SUPPORT FOR DIRECT MEMORY ACCESS TRANSLATION

This application is a continuation of U.S. patent application Ser. No. 11/157,675 filed Jun. 21, 2005 now abondoned entitled "Address Window Support for Direct Memory Access Translation."

FIELD OF THE INVENTION

The present invention relates generally to microprocessors, more specifically, the present invention relates to input/output (I/O) virtualization.

BACKGROUND

As microprocessor architecture becomes more and more complex to support high performance applications, I/O management presents a challenge. Existing techniques to address the problem of I/O management have a number of disadvantages. One technique uses software-only I/O virtualization to support virtual machine (VM) I/O. This technique has limited functionality, performance, and robustness.

The functionality seen by the guest operating system (OS) and applications is limited by the functionality supported by the virtual devices emulated in the VM monitor (VMM) software. The guest I/O operations are trapped by the VMM and proxied or emulated before being submitted to the underlying physical-device hardware, resulting in poor performance.

In addition, all or parts of the device driver for the hardware device are run as part of the privileged VMM software, which may adversely affect overall robustness of the platform. Techniques using specialized translation structures can only support a specific device or a limited usage model. General I/O memory management units provide only support for I/O virtual address spaces of limited size or complexity.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

FIG. 10 illustrates one embodiment of an address window flush register format;

DETAILED DESCRIPTION

A Direct Memory Access (DMA) translation architecture implementing address window based translation is described. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
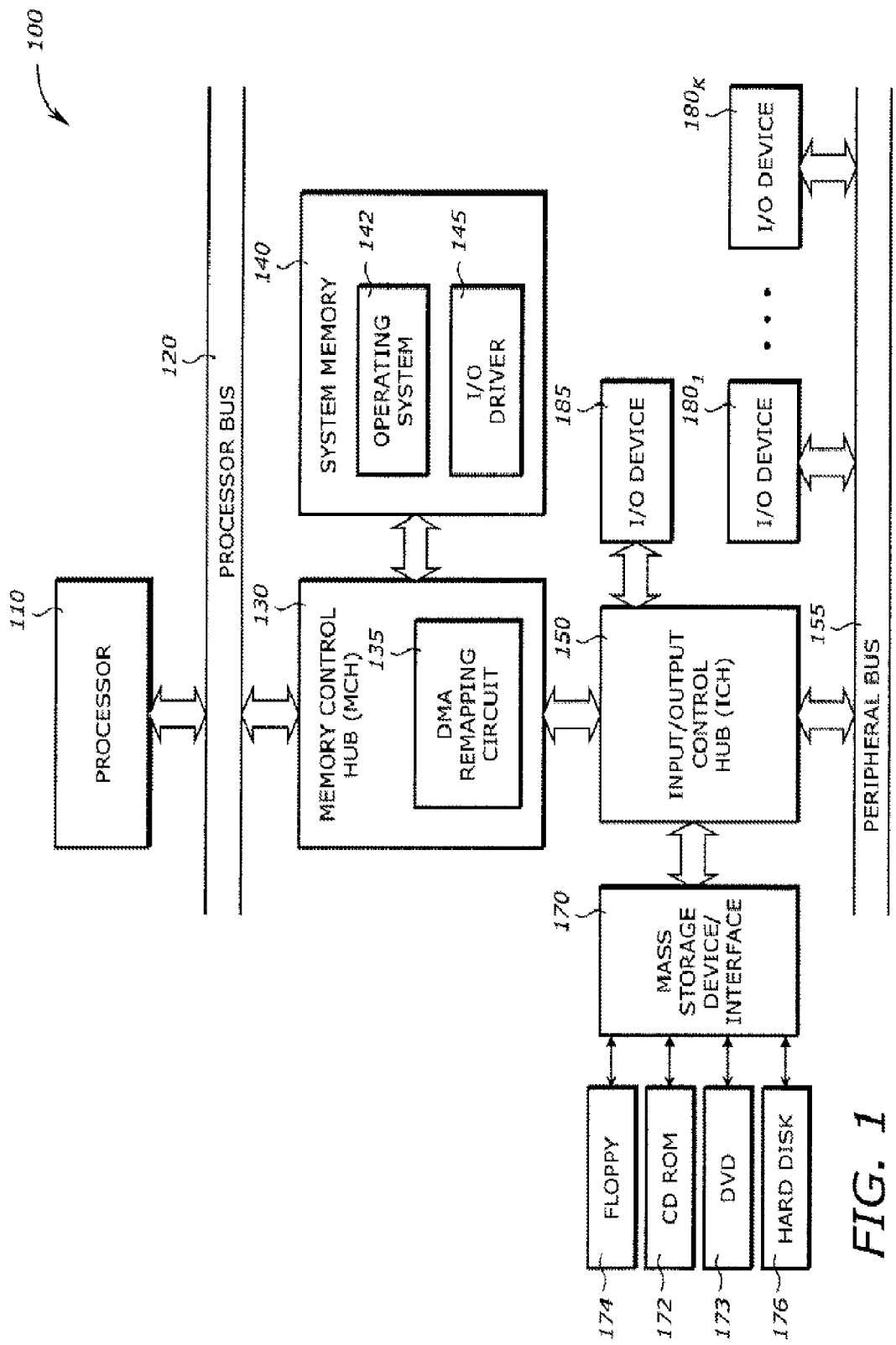
FIG. 1 illustrates one embodiment of a computer system.

FIG. 1 illustrates one embodiment of a computer system 100. Computer system 100 includes a processor 110, a processor bus 120, a memory control hub (MCH) 130, a system memory 140, an input/output control hub (ICH) 150, a peripheral bus 155, a mass storage device/interface 170, and input/output devices $180_1$ to $180_K$, and 185. Note that the system 100 may include more or fewer elements than the above.

The processor 110 represents a central processing unit of any type of architecture, such as embedded processors, mobile processors, micro-controllers, digital signal processors, superscalar processors, multi-threaded processors, multi-core processors, vector processors, single instruction multiple data (SIMD) computers, complex instruction set computers (CISC), reduced instruction set computers (RISC), very long instruction word (VLIW), or hybrid architecture.

The processor bus 120 provides interface signals to allow the processor 110 to communicate with other processors or devices, e.g., MCH 130. The processor bus 120 may support a uni-processor or multiprocessor configuration. The processor bus 120 may be parallel, sequential, pipelined, asynchronous, synchronous, or any combination thereof.

MCH 130 provides control and configuration of memory and input/output devices such as the system memory 140 and the ICH 150. MCH 130 may be integrated into a chipset that integrates multiple functionalities such as the isolated execution mode, host-to-peripheral bus interface, memory control. MCH 130 interfaces to the peripheral bus 155 directly or via the ICH 150. For clarity, not all the peripheral buses are shown. It is contemplated that the system 100 may also include peripheral buses such as Peripheral Component Interconnect (PCI), PCI Express, accelerated graphics port (AGP), Industry Standard Architecture (ISA) bus, and Universal Serial Bus (USB), etc.

MCH 130 includes a direct memory access (DMA) remapping circuit 135. DMA remapping circuit 135 maps an I/O device (e.g., one of the I/O device $180_1$ to $180_K$ and 185) into a domain in the system memory 140 in an I/O transaction. The I/O transaction is typically a DMA request. DMA remapping circuit 135 provides hardware support to facilitate or enhance I/O device assignment and/or management. DMA remapping circuit 135 may also be included in any chipset other than MCH 130, such as ICH 150. It may also be implemented, partly or wholly, in the processor 110, or as a separate processor or co-processor to other processors or devices.

The system memory 140 stores system code and data. The system memory 140 is typically implemented with dynamic random access memory (DRAM) or static random access memory (SRAM). The system memory may include program code or code segments implementing one embodiment of the invention. The system memory includes an operating system (OS) 142, or a portion of the OS, or a kernel, and an I/O driver 145. Any one of the elements of the OS 142 or the I/O driver 145 may be implemented by hardware, software, firmware, microcode, or any combination thereof. The system memory 140 may also include other programs or data which are not shown.

ICH 150 has a number of functionalities that are designed to support I/O functions. ICH 150 may also be integrated into a chipset together or separate from the MCH 130 to perform I/O functions. ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device/interface 170 provides storage of archive information such as code, programs, files, data, applications, and operating systems. The mass storage device/interface 170 may interface to a compact disk (CD) ROM 172, a digital video/versatile disc (DVD) 173, a floppy drive 174, and a hard drive 176, and any other magnetic or optic storage devices. The mass storage device/interface 170 provides a mechanism to read machine-accessible media. The machine-accessible media may contain computer readable program code to perform tasks as described in the following.

The I/O devices $180_1$ to $180_K$ may include any I/O devices to perform I/O functions including DMA requests. They are interfaced to the peripheral bus 155. Examples of I/O devices $180_1$ to $180_K$ include controller for input devices (e.g., keyboard, mouse, trackball, pointing device), media card (e.g., audio, video, graphics), network card, and any other peripheral controllers. The I/O device 185 is interfaced directly to the ICH 150. The peripheral bus 155 is any bus that supports I/O transactions. Examples of the peripheral bus 155 include the PCI bus, PCI Express, etc.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, read only memory, erasable read only memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

In a standard computing platform, the I/O subsystem components function as part of a single domain and are managed by the operating-system software. One embodiment of the invention provides the hardware support required to assign I/O devices in a computing platform to multiple domains.

A domain is abstractly defined as an isolated environment in the platform, to which a sub-set of the host-physical memory is allocated. The host-physical memory is included in the system memory 140. I/O devices that are allowed to directly access the physical memory that is allocated to a domain are referred to as the domain's assigned devices. The isolation property of a domain is achieved by blocking access to its physical memory from resources not assigned to it. Multiple isolated domains are supported by ensuring all I/O devices are assigned to some domain (possibly a default domain), and by restricting access from each assigned device only to the physical memory allocated to its domain. Domains may share resources (e.g., memory, I/O devices) or be completely isolated from each other at the discretion of the software or other entity performing the partitioning.

Each domain has a view of physical memory, or a physical address space, that may be different than the system view of physical memory. An address used by a domain's resources to access its physical address space is referred to as a guest-physical address (GPA). The host-physical address (HPA) refers to the system physical address used to access memory. A domain is considered relocated if one or more of its GPAs must be translated to a new HPA which differs from the GPA to access its allocated system physical memory. A domain is referred to as non-relocated if all of its guest-physical addresses are the same as the host-physical addresses used to access its allocated system physical memory. Both relocated and non-relocated domains may be allocated a subset of the available system physical memory and may be prevented from accessing certain portions of the memory. Physical memory protection and partitioning requires a physical-address translation mechanism and a protection mechanism that can validate guest-physical addresses generated by a domain's assigned devices, including processors and I/O devices, and translate it to valid host-physical addresses. The DMA remapping circuit 135 provides this support.

For assigning I/O devices to domains, physical-address translation and protection are applied for DMA requests from all I/O devices in the platform. For simplicity, the physical address translation functionality for I/O device DMA requests is referred to as DMA remapping. In discussions that follow, it should be understood that the term "remapping" also includes protection mechanisms in addition to the mapping of addresses from one address space to another (e.g., guest-physical addresses to host-physical addresses).

Figure 2:
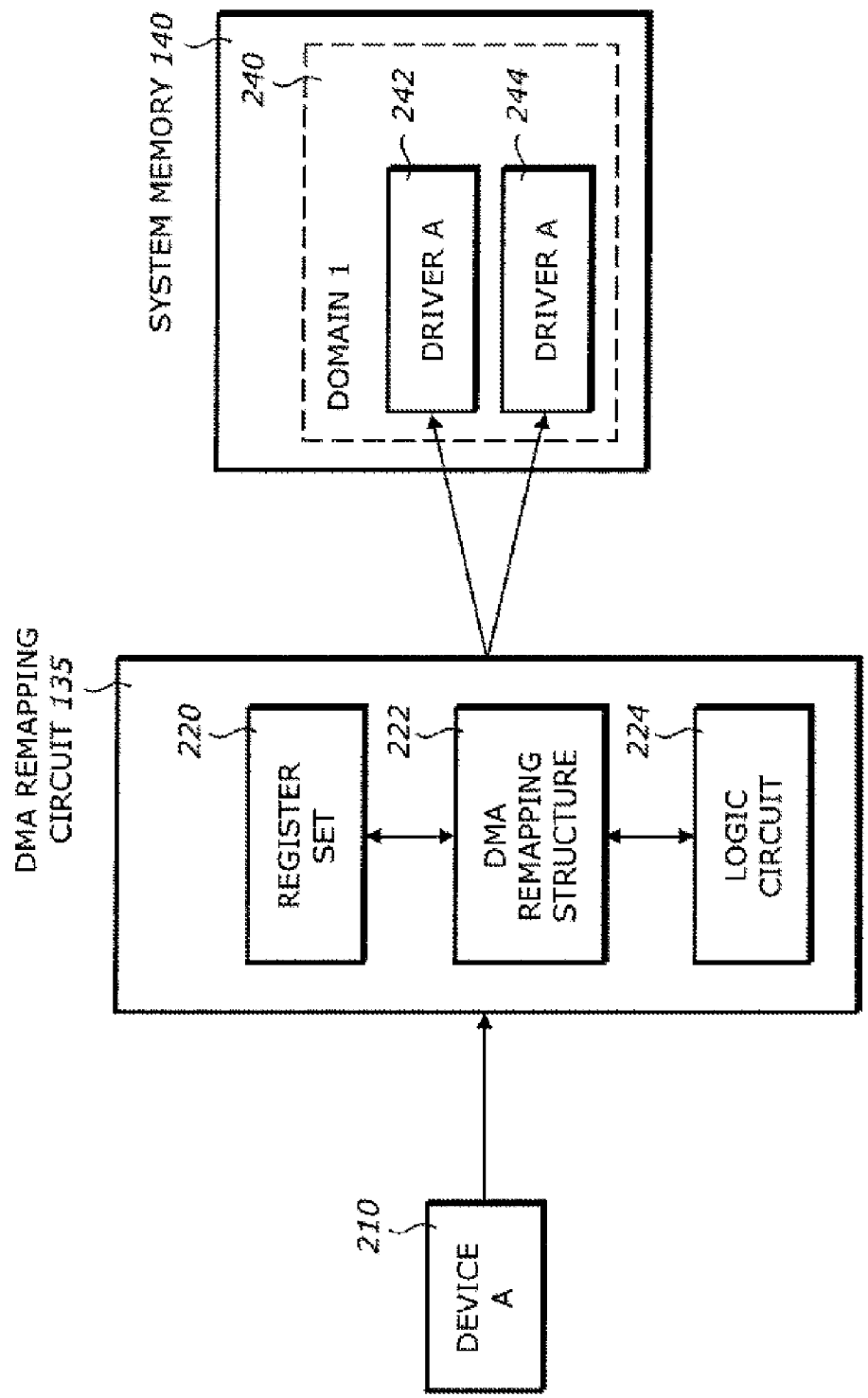
FIG. 2 illustrates one embodiment of an input/output (I/O) device assignment.

FIG. 2 is a diagram illustrating one embodiment of I/O device assignment. The I/O device assignment is a mapping of an I/O device to a domain in the system memory 140. The mapping is supported by DMA remapping circuit 135. As an example, device A 210 is mapped into domain 1 240 in the system memory 140. The domain 1 may have two drivers 242 and 244 for the device A 210.

DMA remapping circuit 135 includes a register set 220, a DMA remapping structure 222, and a logic circuit 224. The register set 220 includes a number of registers that provides control or status information used by the DMA remapping structure 222, the logic circuit 224, and the programs or drivers for the I/O devices. The DMA remapping structure 222 provides the basic structure, storage, or tables used in the remapping or address translation of the guest-physical address to the host-physical address in an appropriate domain. The logic circuit 224 includes circuitry that performs the remapping or address translation operations and other interfacing functions. The DMA remapping circuit 135 may have different implementations to support different configurations and to provide different capabilities for the remapping or address translation operations.

I/O device assignment and/or management using the DMA remapping circuit 135 provides a number of usages or applications. Two useful applications are OS robustness applications and virtualization applications.

OS Robustness applications: Domain isolation has multiple uses for operating-system software. For example, an OS may define a domain containing its critical code and data structures in memory, and restrict access to this domain from all I/O devices in the system. This allows the OS to limit erroneous or unintended corruption of data and code through incorrect programming of devices by device drivers, or certain classes of device failures thereby improving its robustness. Alternatively, an OS may allow a subset of trusted devices to access critical code and data structures in memory but disallow access from other devices.

In another usage, the OS may use domains to better manage DMA from legacy 32-bit PCI devices to high memory (above 4 GB). This is achieved by allocating 32-bit devices to one or more domains and programming the I/O-physical-address-translation mechanism to remap the DMA from these devices to high memory. Without such support, the software has to resort to data copying through OS bounce buffers.

In a more involved usage, an OS may manage I/O by creating multiple domains and assigning one or more I/O devices to the individual domains. In this usage, the device drivers explicitly register their I/O buffers with the OS, and the OS assigns these I/O buffers to specific domains, using hardware to enforce the DMA domain protections. In this model, the OS uses the I/O address translation and protection mechanism as an I/O memory management unit (I/O MMU).

Virtualization applications: The virtualization technology allows for the creation of one or more virtual machines (VMs) on a single system. Each VM may run simultaneously utilizing the underlying physical hardware resources. Virtual machines allow multiple operating system instances to run on the same processor offering benefits such as system consolidation, legacy migration, activity partitioning and security.

Virtualization architectures typically involve two principal classes of software components: (a) Virtual machine monitors (VMMs) and (b) Virtual Machines (VMs). The VMM software layer runs at the highest privilege level and has complete ownership of the underlying system hardware. The VMM allows the VMs to share the underlying hardware and yet provides isolation between VMs.

The limitations of software-only methods for I/O virtualization can be removed by direct assignment of I/O devices to VMs using DMA remapping circuit 135. With direct assignment of devices, the driver for an assigned I/O device runs only in the VM to which it is assigned and is allowed to interact directly with the device hardware without trapping to the VMM. The hardware support enables DMA remapping without device specific knowledge in the VMM.

In this model, the VMM restricts itself to a controlling function where it explicitly does the set-up and tear-down of device assignment to VMs. Rather than trapping to the VMM for guest I/O accesses as in the case of software-only methods for I/O virtualization, the VMM requires the guest I/O access trapping only to protect specific resources such as device configuration space accesses, interrupt management etc., that impact system functionality.

To support direct assignment of I/O devices to VMs, a VMM manages DMA from I/O devices. The VMM may map itself to a domain, and map each VM to an independent domain. The I/O devices can be assigned to domains, and the physical address translation hardware provided by the DMA remapping circuit 135 may be used to allow the DMA from I/O devices only to the physical memory assigned to the assigned VM's domain. For VMs that may be relocated in physical memory (i.e., the GPA not identical to the HPA), the DMA remapping circuit 135 can be programmed to do the necessary GPA-to-HPA translation.

With hardware support for I/O device assignment, VMM implementations can choose a combination of software-only I/O virtualization methods and direct device assignment for presenting I/O device resources to a VM.

Figure 3:
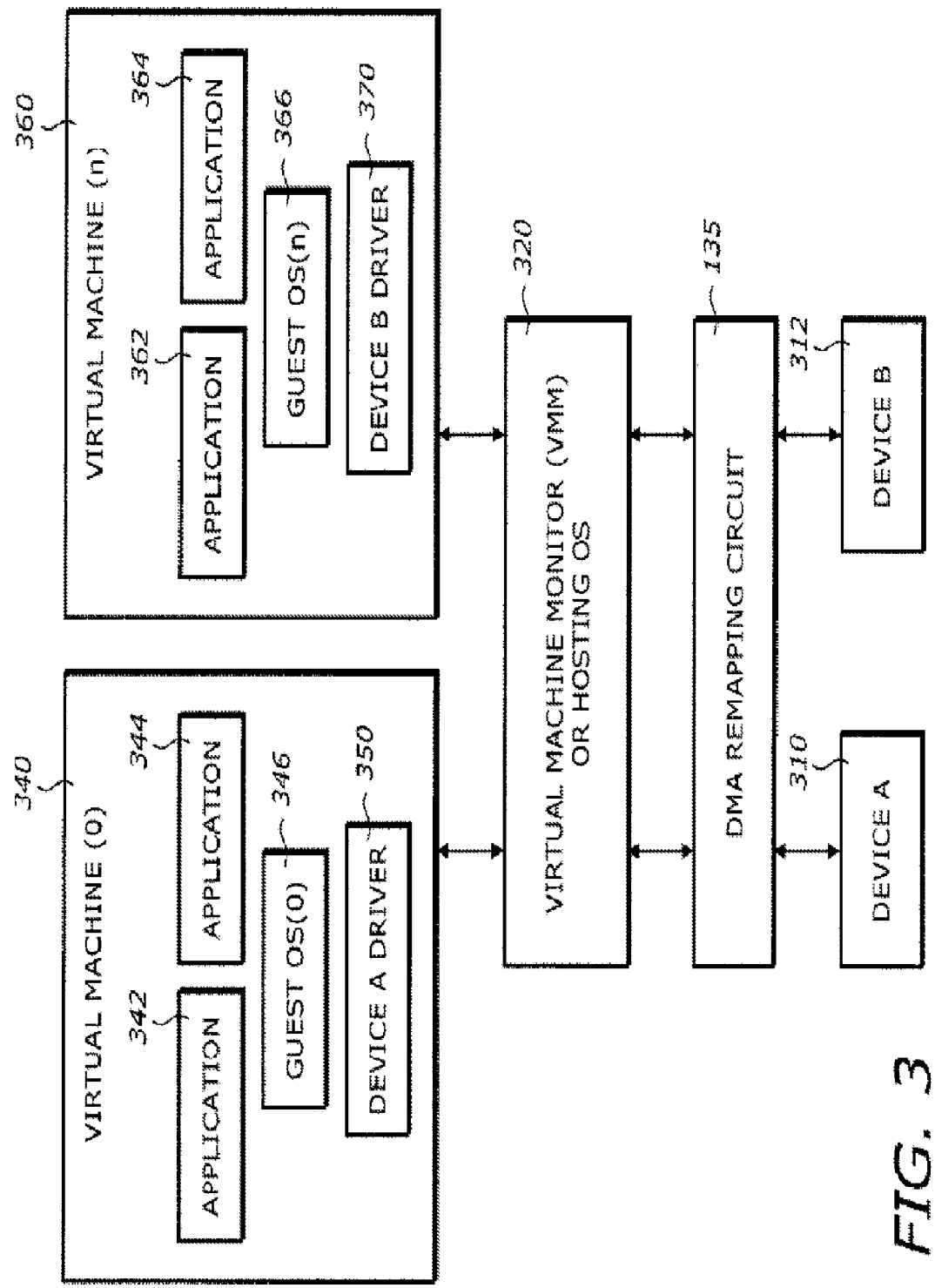
FIG. 3 illustrates one embodiment of virtualization using direct memory access (DMA) remapping.

FIG. 3 is a diagram illustrating one embodiment of virtualization using DMA remapping. The virtualization includes two devices A and B 310 and 312, the DMA remapping circuit 135, a VMM or hosting OS 320, $VM_0$ 340 and $VM_n$ 360. The two devices A and B 310 and 312 are two I/O devices that are supported by the two VM 340 and 360, respectively. DMA remapping circuit 135 directly maps these two devices to the respective VM's 340 and 360 without specific knowledge of the VMM or hosting OS 320. More or fewer I/O devices and VMs may be supported.

The VMM or the hosting OS 320 provides support for the underlying hardware of the platform or the system on which it is executing. VMs 340 and 360 have similar architectural components but are completely isolated from each other. They are interfaced to the VMM or hosting OS 320 to access to the system hardware. VM 340 includes applications 342 and 344. More or fewer applications may be supported. It has a guest OS 346 and a device A driver 350. The device A driver 350 is a driver that drives, controls, interfaces, or supports the device A 310. Similarly, VM 360 includes applications 362 and 364. More or fewer applications may be supported. It has a guest OS 366 and a device B driver 370. The guest OS 366 may be the same or different than the guest OS 346 in the VM 340. The device B driver 370 is a driver that drives, controls, interfaces, or supports the device B 312.

The DMA remapping architecture provided by the DMA remapping circuit 135 facilitates the assigning of I/O devices to an arbitrary number of domains. Each domain has a physical address space that may be different than the system physical address space. The DMA remapping provides the transformation of guest-physical address (GPA) in DMA requests from an I/O device to the corresponding host-physical address (HPA) allocated to its domain.

To support this, the platform may support one or more I/O physical address translation hardware units. Each translation hardware unit supports remapping of the I/O transactions originating from within its hardware scope. For example, a desktop chipset implementation may expose a single DMA remapping hardware unit that translates all I/O transactions at the memory controller hub (MCH) component. A server platform with one or more core chipset components may support independent translation hardware units in each component, each translating DMA requests originating within its I/O hierarchy. The architecture supports configurations where these hardware units may share the same translation data structures in system memory or use independent structures depending on software programming.

The chipset DMA remapping circuit 135 treats the addresses in DMA requests as guest-physical addresses (GPA). DMA remapping circuit 135 may apply the address translation function to the incoming address to convert it to a host-physical address (HPA) before further hardware processing, such as snooping of processor caches or forwarding to the memory controller.

In a virtualization context, the address translation function implemented by DMA remapping circuit 135 depends on the physical-memory management supported by the VMM. For example, in usages where the software does host-physical memory allocations as contiguous regions, the DMA translation for converting GPA to HPA may be a simple offset addition. In usages where the VMM manages physical memory at page granularity, DMA remapping circuit 135 may use a memory-resident address translation data structure.

Figure 4:
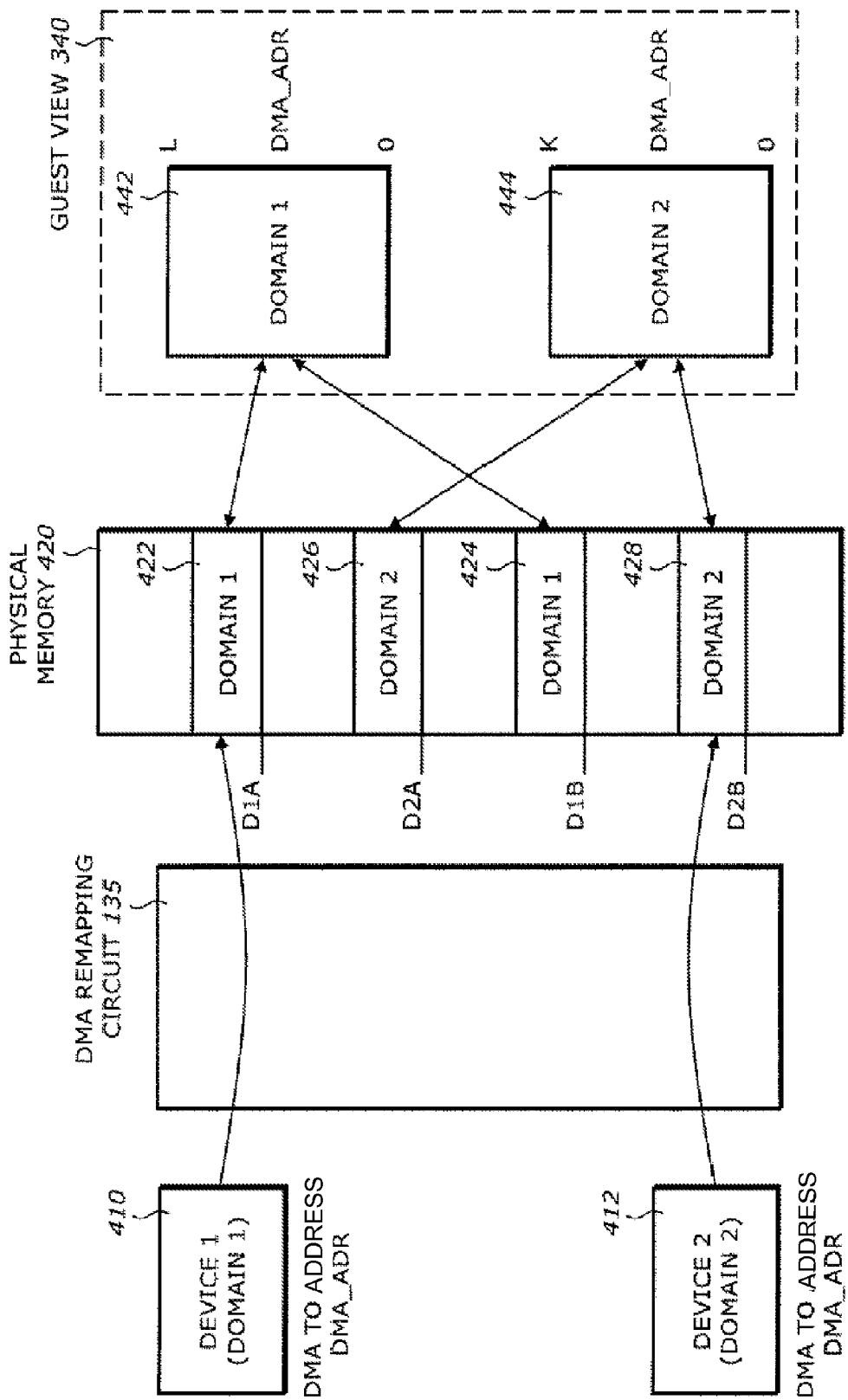
FIG. 4 illustrates one embodiment of an I/O address translation.

FIG. 4 is a diagram illustrating one embodiment of an I/O address translation. The I/O address translation includes two I/O devices 1 and 2 410 and 412, the DMA remapping circuit 135, a physical memory 420, and a guest view 430. The I/O devices 1 and 2 410 and 412 are assigned to two separate domains. They perform I/O requests or DMA requests to addresses DMA_ADR.

DMA remapping circuit 135 maps these two devices to corresponding domains allocated in the physical memory 420. The physical memory 420 is partitioned into memory segments 422 and 424 and memory segments 426 and 428. More or fewer allocated memory segments may be assigned to one or more of the domains. In FIG. 4, memory segments 422 and 424 are assigned to domain 1 442 and correspond to device 1 410 and memory segments 424 and 428 are assigned to domain 2 444 and correspond to device 1 412. In the example illustrated in FIG. 4, device 1 410 is mapped to the domain 1 422 and the device 2 412 is mapped or assigned to the domain 2 428.

The guest view 430 is a logical view from the guest I/O devices. It includes domain 1 442 and domain 2 444. The domain 1 442 corresponds to the two memory segments 422 and 424 in the physical memory 420. The domain 2 444 corresponds to the two memory segments 426 and 428. For a particular guest, domains may be allocated portions of the guest view 430 of physical memory. Each of the domains may be assigned to one or more I/O devices. The DMA_ADR address from the device 1 410 is mapped to the DMA_ADR1 located within the address space from 0 to L of the domain 1 442. Similarly, the DMA_ADR address from the device 2 412 is mapped to the DMA_ADR2 located within the address space from 0 to K of the domain 2 444.

The software responsible for the creation and management of the domains allocates the physical memory 420 for both domains and sets up the GPA-to-HPA address translation function in the DMA remapping circuit 135. The DMA remapping circuit 135 translates the GPAS generated by the devices 410 and 412 to the appropriate HPAs.

Figure 5:
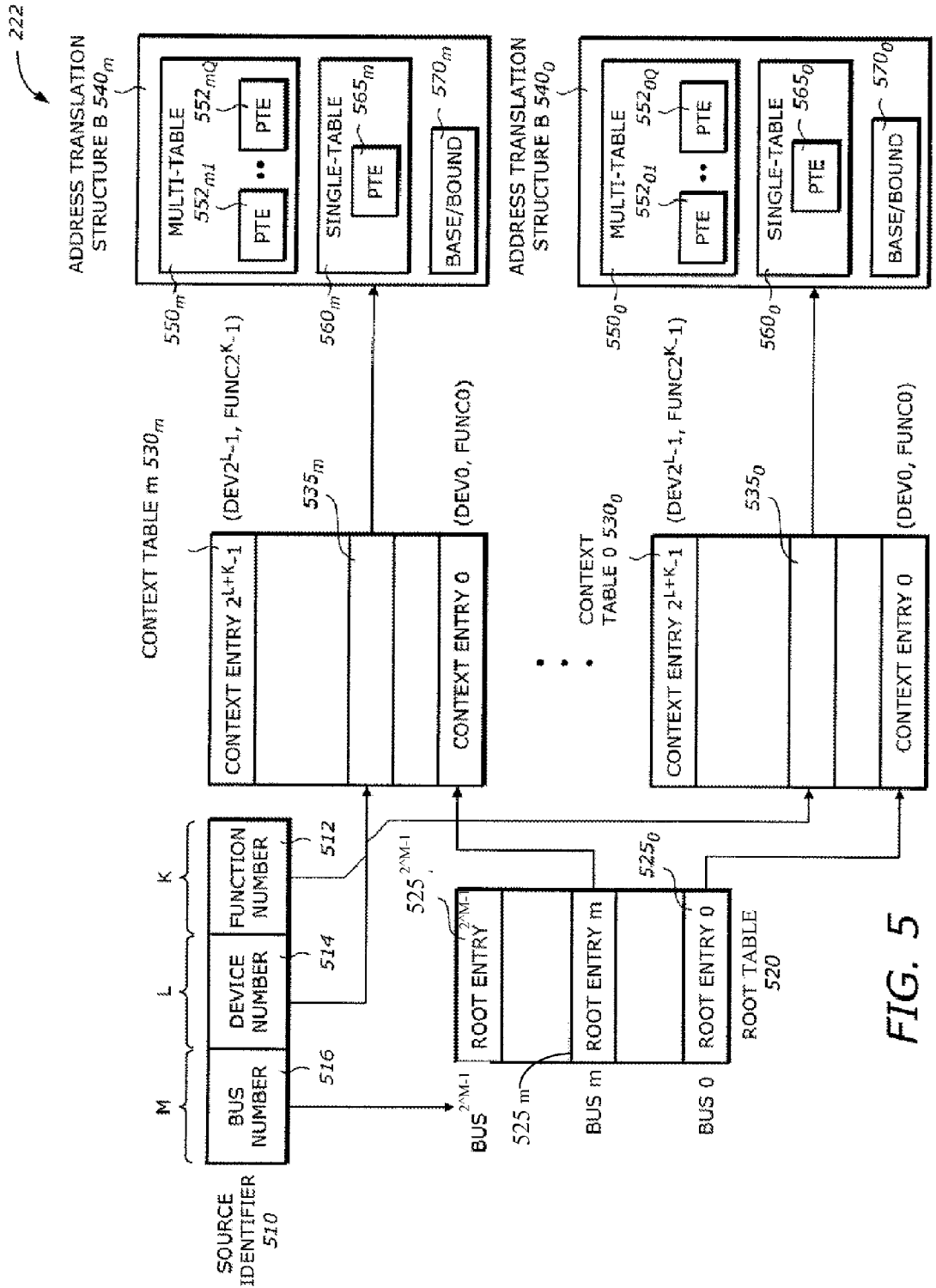
FIG. 5 illustrates one embodiment of a DMA remapping structure.

FIG. 5 is a diagram illustrating one embodiment of a DMA remapping structure 222. DMA remapping structure 222 receives a source identifier 510 and includes a root table 520, a number of context tables, of which two are shown $530_0$ and $530_m$, and a number of address translation structures, of which two are shown $540_0$ and $540_m$. The remapping structure 222 receives the source identifier 510 and a guest-physical address from the I/O device, and translates the guest-physical address in an assigned domain to a host-physical address. The translation may be performed using translation tables arranged in a hierarchical manner. The translation mechanism starts from the root table 520 and traverses, or walks, through the context tables (e.g., $530_0$ and $530_m$) and the address translation structures (e.g., $540_0$ and $540_m$).

The requestor identity of the I/O transactions appearing at DMA remapping circuit 135 determines the originating device and the domain that the originating I/O device is assigned to. The source identifier 510 is the attribute identifying the originator of an I/O transaction. DMA remapping circuit 135 may determine the source identifier 510 of a transaction in implementation specific ways. For example, some I/O bus protocols may provide the originating device identity as part of each I/O transaction. In other cases, such as for chipset integrated devices, the source identifier 510 may be implied based on the chipset's architecture or implementation.

For PCI Express devices, source identifier 510 is mapped to the requestor identifier provided as part of the I/O transaction header. The requestor identifier of a device includes its PCI Bus/Device/Function numbers assigned by the configuration software and uniquely identifies the hardware function that initiates the I/O request. In one embodiment, the source identifier 510 includes a function number 512, a device number 514, and a bus number 516. In the example illustrated in FIG. 5, the function number 512 is K-bit wide, the device number 514 is L-bit wide, and the bus number 516 is M-bit wide. The bus number 516 identifies the bus on which the I/O transaction is generated. The device number 514 identifies the specific device on the identified bus. The function number 512 identifies the specific function of the I/O device. The source identifier 510 is used to index or look up the root table 520 and the context tables (e.g., $530_0$ and $530_m$). In the example illustrated in FIG. 5, their paths through the DMA remapping structure 222 are illustrated for two I/O transactions using bus 0 and bus m, respectively.

For PCI Express devices, the root table 520 stores root entries $525_0$ to $525_{2^M-1}$ indexed by the source identifier 510, or the bus number 516 of the source identifier 510. The root entries function as the top level structure to map devices on a specific bus to its respective parent domain. The root entry 0 $525_0$ corresponds to the I/O transaction using bus 0. The root entry m $525_m$ corresponds to the I/O transaction using bus m. The root entries 0 $525_0$ and $525_m$ point to the context tables $530_0$ and $530_m$, respectively. In one embodiment, these entries provide the base address for the corresponding context table.

The context tables 530 (e.g., $530_0$ and $530_m$) store context entries 535 (e.g., $535_0$ and $535_m$) referenced by the root entries. The context entries 535 map the I/O devices to their corresponding domain(s). The device number 514 and the function number 512 are used to obtain the context entry corresponding to the I/O transaction. In one embodiment, they form an index to point to, or reference, the context table referenced by the corresponding root entry. There are $2^M*2^L*2^K$ or $2^{M+L+K}$ context entries in all context tables. In one embodiment, K=3, L=5, and M=8, resulting in a total of 64K entries, organized as $2^M$ ($2^8$=256) context tables. In the example shown in FIG. 4, the two context entries for the two I/O transactions are the context entry $535_0$ in the context table $530_0$ and the context entry $535_m$ in the context table $530_m$. The context entries $535_0$ and $535_m$ point to the address translation structures $540_0$ and $540_m$, respectively.

The address translation structures 540 (e.g., $540_0$ and $540_m$) provide the address translation to the host-physical address using the guest-physical address corresponding to the I/O transaction. Each of the address translation structures may be a multi-table 550, a single table 560, or a base/bound 570 corresponding to the three translation mechanisms using multi tables, single table, and base/bound translations, respectively. In the following description, a regular page size of 4 KB is used. As is known by one skilled in the art, any other sizes may also be used.

To provide software flexible control of DMA remapping circuit 135, DMA remapping circuit 135 has a number of registers included in register set 220 shown in FIG. 2. Register set 220 is located in the host-physical address space through a Base Address Register (BAR). The translation hardware BAR is exposed to software in an implementation dependent manner. This may be exposed as a PCI configuration space register in one of the chipset integrated devices, such as the memory controller device. In one embodiment, the BAR provides a minimum of 4K address window. A register in the register set 220 may have a number of fields. A field may be asserted or negated. When a field consists of only a single bit, assertion implies that the bit is set to a defined logical state (e.g., TRUE, logical one) and negation implies that the bit is reset to a defined logic state that is complementary to the state of the assertion (e.g., FALSE, logical zero). In the following, the use of an asserted or negated state is arbitrary. A field may be asserted to indicate a first state and negated to indicate a second state, or vice versa.

A field in a register may be programmed, initialized, or configured by DMA remapping circuit 135 and/or by the software. It may also correspond to a specialized hardware circuit or a functionality implemented by a data structure, a function, a routine, or a method. In the following, fields are grouped into registers. The grouping, formatting, or organization of these fields or bits in the following registers is for illustrative purposes. Other ways of grouping, formatting, or organizing these fields may be used. A field may also be duplicated in more than one registers. A register may have more or fewer than the fields as described. In addition, registers may be implemented in a number of ways, including as storage elements or memory elements.

The DMA remapping architecture described above includes DMA that is translated using single or multiple level page tables (TLBs), as shown in FIG. 5. Such an architecture is suitable for legacy software usages (e.g., where the OS or VMM doesn't know about driver DMA usages). Further, single or multiple level page table translations may offer good-to-average DMA performance for most I/O devices (as measured by DMA throughput). However, such a system has limitations.

One limitation is that the worst case latency introduced by multiple sequential memory accesses for the page-walk on TLB misses is prohibitive for I/O devices whose performance depends on guaranteed worst case (isochronous) DMA performance. Examples of these types of devices include PCI Express devices supporting isochronous DMA (such as a high performance audio controller), display engines of graphics devices, and USB controller devices.

Another limitation is that for non-legacy software usages (e.g., newer OSs and VMMs) that may know more about driver DMA usages, the current architecture does not provide any means for software to provide DMA usage hints to improve DMA-remapping performance.

Finally, the memory access latencies for page-walks increase as, for example, platform configurations move to memory controllers implemented within the processor complex.

Address Window Based DMA Address Translation

Based on the above-described limitations of DMA remapping architecture, DMA remapping circuit 135 is configured to support address window-based address translation in addition to the single and multi-level page-table based address translation. Thus, each DMA remapping circuit 135 may support a number of address windows, with the exact number of address windows supported being a function of hardware implementation. In one embodiment, the system firmware assigns an address window (AW) range (start and end AW numbers) for each DMA remapping circuit 135.

In a further embodiment, the chipset supports an additional caching structure in addition to existing remapping circuit 135 caching structures. These additional structures are referred to as AWPTR tables implemented for address window translations. AWPTR tables will be discussed below in greater detail.

According to one embodiment, a device-physical address (DPA) refers to a target address specified by I/O devices in its DMA requests. In one embodiment, the DPA address space spans across all I/O devices in the computer system and is sub-divided into multiple AWs. In such an embodiment, each AW covers a contiguous 2 MB region of DPA space. For example, an AW0 may cover DPA 0 to 2 MB, an AW1 may cover DPA 2 MB to 4 MB, etc. Given any DPA, the associated AW number is determined by examining bits in the DPA (e.g., AW#:=DPA[63:21]).

Figure 6:
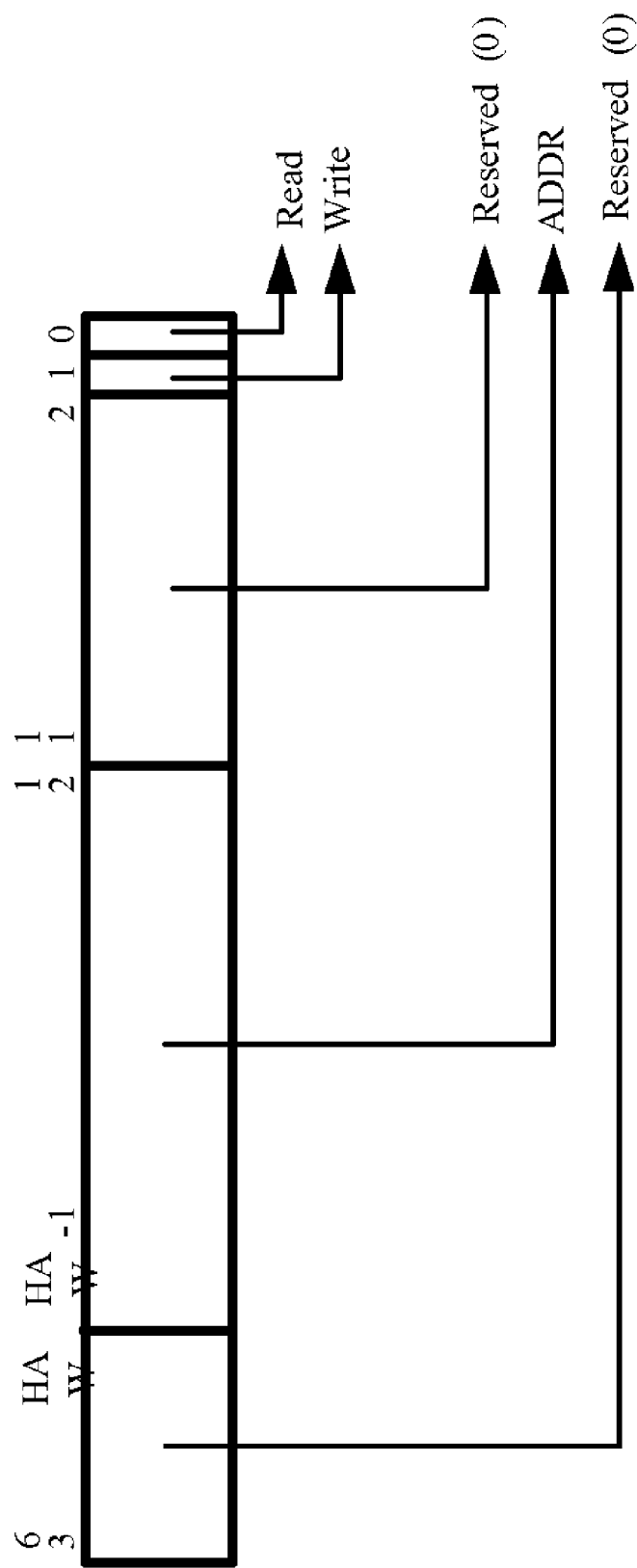
FIG. 6 illustrates one embodiment of an address window page table entry format.

In a further embodiment, each AW is described by a DPA-to-HPA translation structure in memory called an Address Window page-table (AWPT). The entries in an AWPT are called AW page-table-entries (AWPTE). Each AWPTE provides the translation for a 4 KB region (referred as a slot) within the AW. Thus, there are 512 slots in an AW, and the AWPT associated with each AW is 4 KB in size (with 512 AWPTEs). According to one embodiment, AWPTEs are 64-bits in size and have the format illustrated in FIG. 6. In one embodiment, an AWPTE includes access control bits such as bits ("read" and "write") specifying if read accesses and/or write accesses are allowed to the DPA used to access the AWPTE. In one embodiment, the address field ("ADDR") specifies the mapping of a subset of the bits in the DPA to HPA. In one embodiment, the remaining bits (e.g., bits [11:0]) may be passed unmodified from the DPA to the HPA. Many other configurations are possible and do not limit the scope of the invention.

The system software can bind one or more AWs to specific I/O devices. For this, the driver registers its DMA buffers (e.g., in the host-physical address space) with the AW bound to the device to generate a DPA mapping. The driver for a device identifies its target buffers to the device hardware using its DPA. Addresses in DMA requests from the device are DPAs that are translated by remapping circuit 135 based on the AW bound to the device and the DPA-to-HPA translations for the address window.

Figure 7:
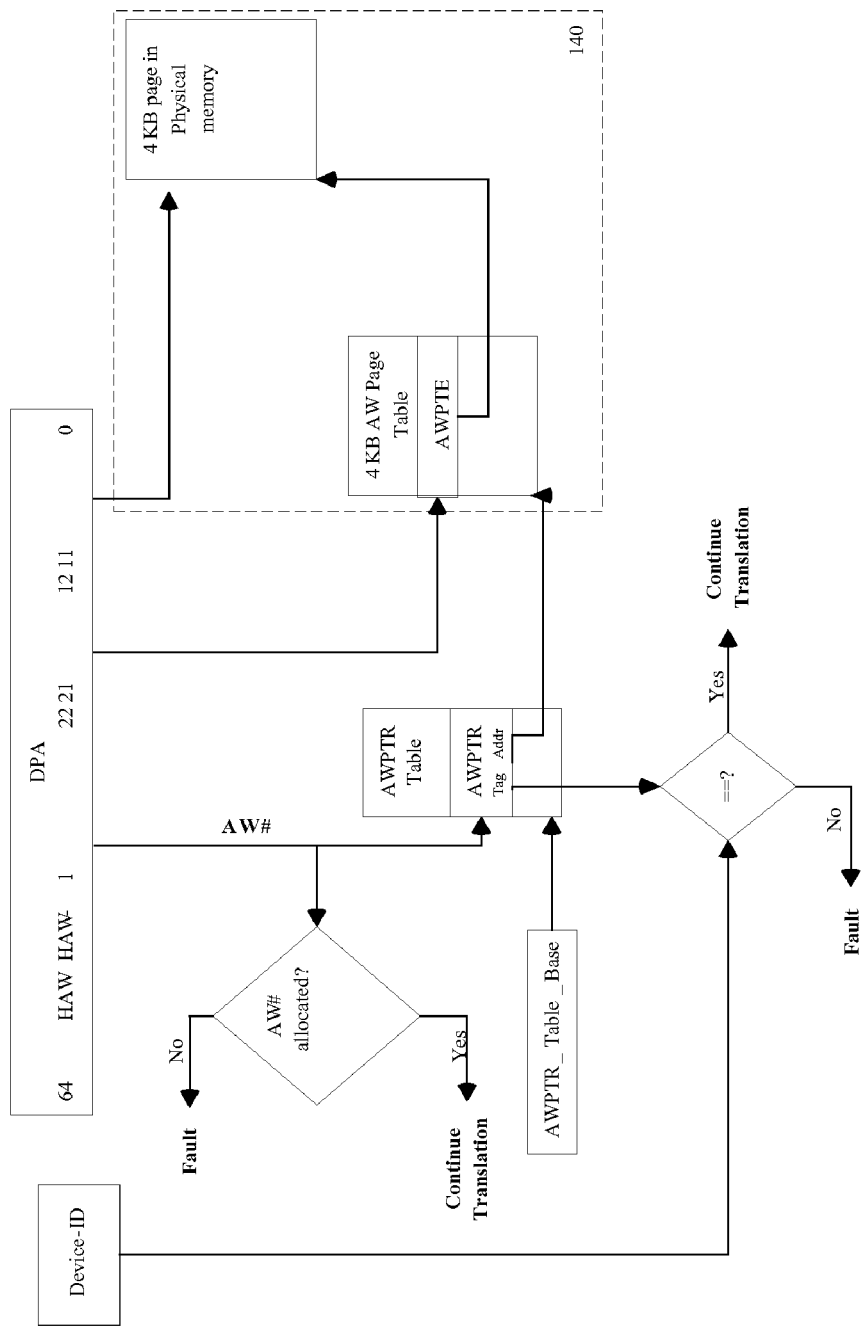
FIG. 7 illustrates one embodiment of a process for address-window-based DMA address translation.

FIG. 7 illustrates one embodiment of a process for translating DMA addresses in the presence of address windows. FIG. 7 illustrates the use of AWPTs and AWPTR tables to provide the translation. In one embodiment, the AWPTR table in remapping circuit 135 has as many entries as the number of address windows supported by its remapping circuit 135. Entries in an AWPTR table are associated with a specific AW configured on its remapping circuit 135.

Further, each AWPTR table entry includes the HPA to the base of the AWPT for the particular AW. Each AWPTR table entry is tagged with the device-id of the I/O device to which the associated AW is allocated. In one embodiment, the AWPTR table structure is memory-mapped to allow software to modify entries in it. The base address of the AWPTR table is referred as AWPTR_TABLE_BASE. AWPTR table entries are called AWPTRs, and a specific entry at a particular index in the cache is notated as AWPTR[index].

Figure 8:
FIG. 8 illustrates one embodiment of an address window table format.

FIG. 8 illustrates one embodiment of an AWPTR table structure for a chipset implementing two remapping circuits 135, with each configured to support two AWs (4 to 5, and 6 to 7, respectively). According to one embodiment, although the AWPTR table is stored in registers, the table appears to software to reside at an address specified by AWPTR_TABLE_BASE.

Further, in an embodiment, each entry in the AWPTR table includes Valid, Tag and Data fields. The Valid field indicates whether an entry is valid. In another embodiment, there is no valid bit and the remapping circuit 135 treats all AWPTR table entries as being valid. The Tag field indicates the particular device ID to which the entry is associated. For example, in FIG. 8 software has bound AW 4 to an I/O device with device ID 11 and AW 6 to an I/O device with device ID 18. In one embodiment, identification of a device originating an access (e.g., determination of device ID) may include information on the bus, device and function within the device. The originator of a DMA request is referred to herein as a "device" or "requesting I/O device" and is identified by a "device ID". However, it should be understood that in other embodiments a single physical device may be identified by one or more device-IDs.

Figure 9:
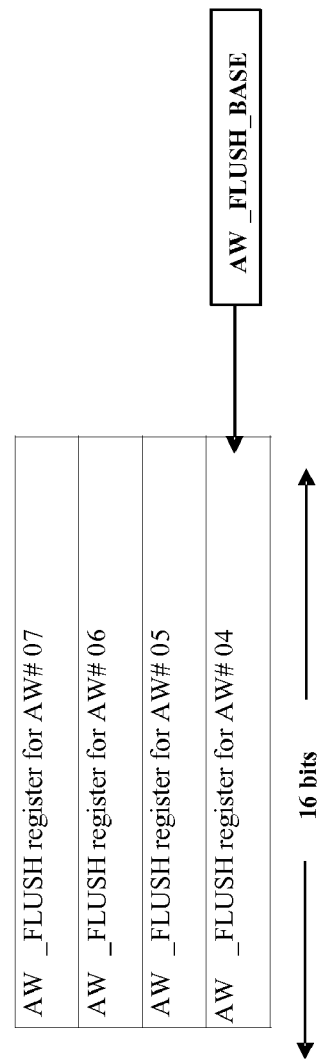
FIG. 9 illustrates one embodiment of address window flush registers.

According to a further embodiment, the remapping circuit 135 supports a set of 16-bit memory mapped registers, called AW_FLUSH registers. FIG. 9 illustrates one embodiment of AW_FLUSH flush registers. The AW_FLUSH flush registers are implemented as a mechanism for software to invalidate translations which may be cached by one or more elements of the remapping circuit 135. In one embodiment, one AW_FLUSH flush register is implemented for each AW supported by a remapping circuit 135.

In one embodiment, the base address of this memory-mapped register range (AW_FLUSH_BASE) is initialized by platform firmware. For example, as illustrated in FIG. 9, if a chipset component supports two remapping circuits 135 and the remapping circuits 135 support AWs 4 to 5 and 6 to 7, respectively, the chipset supports a total of 4 AW_FLUSH registers. FIG. 10 illustrates one embodiment of a format for each AW_FLUSH registers.

Referring back to FIG. 7, address window based translation occurs if specified in the context entry for an I/O device. In one embodiment, the context entries may be cached by the remapping circuit 135, eliminating the need to access memory to make this determination. In a further embodiment, the context entry caching structure is directly accessible by software, allowing software to pre-populate the cache to reduce latencies for the first access to a context entry. In this way, software can guarantee that the worst-case memory access behavior for particular devices is limited to a single memory access, as described below.

If address window based translation is specified, remapping circuit 135 checks to determine if the AW to which the DPA in the DMA request belongs is one of the AWs bound to the specified device. According to one embodiment, remapping circuit 135 performs this check by first finding the address window number (AW#) corresponding to the DPA in the DMA request (e.g., computed by AW#=DPA[(HAW-1):21], where HAW is the supported physical address width of the system).

Subsequently, it is determined if the AW# is allocated to the remapping circuit 135 translating the DMA request. If AW# is not allocated to the remapping circuit 135, a translation fault occurs. In one embodiment, a translation fault may generate an interrupt to the processor. In another embodiment, software managing the remapping circuit 135 is responsible for periodically polling the remapping circuit 135 to determine if any translation faults have occurred. If AW# is valid, the associated AW table entry index is found (computed by INDEX=AW#-START_AW). Next, the AW table entry at AWPTR[INDEX] is accessed, and it is determined whether it is tagged with the device-id in the DMA request. If the check succeeds, the AWPTR value indicates the base of the AW page-table. The value in DPA[21:12] field is used to fetch the appropriate AWPTE in the AW page-table.

Based on the programming of the AWPTE, the DMA request is either completed to the HPA specified in the AWPTE, or it is blocked. The AWPTE processing is similar to how the leaf PTEs are processed in the remapping circuit 135 for the multi-level I/O page-tables described. If the translation succeeds, in one embodiment, it is cached by the remapping circuit 135 in an I/O translation-lookaside buffer (I/O TLB).

Figure 11:
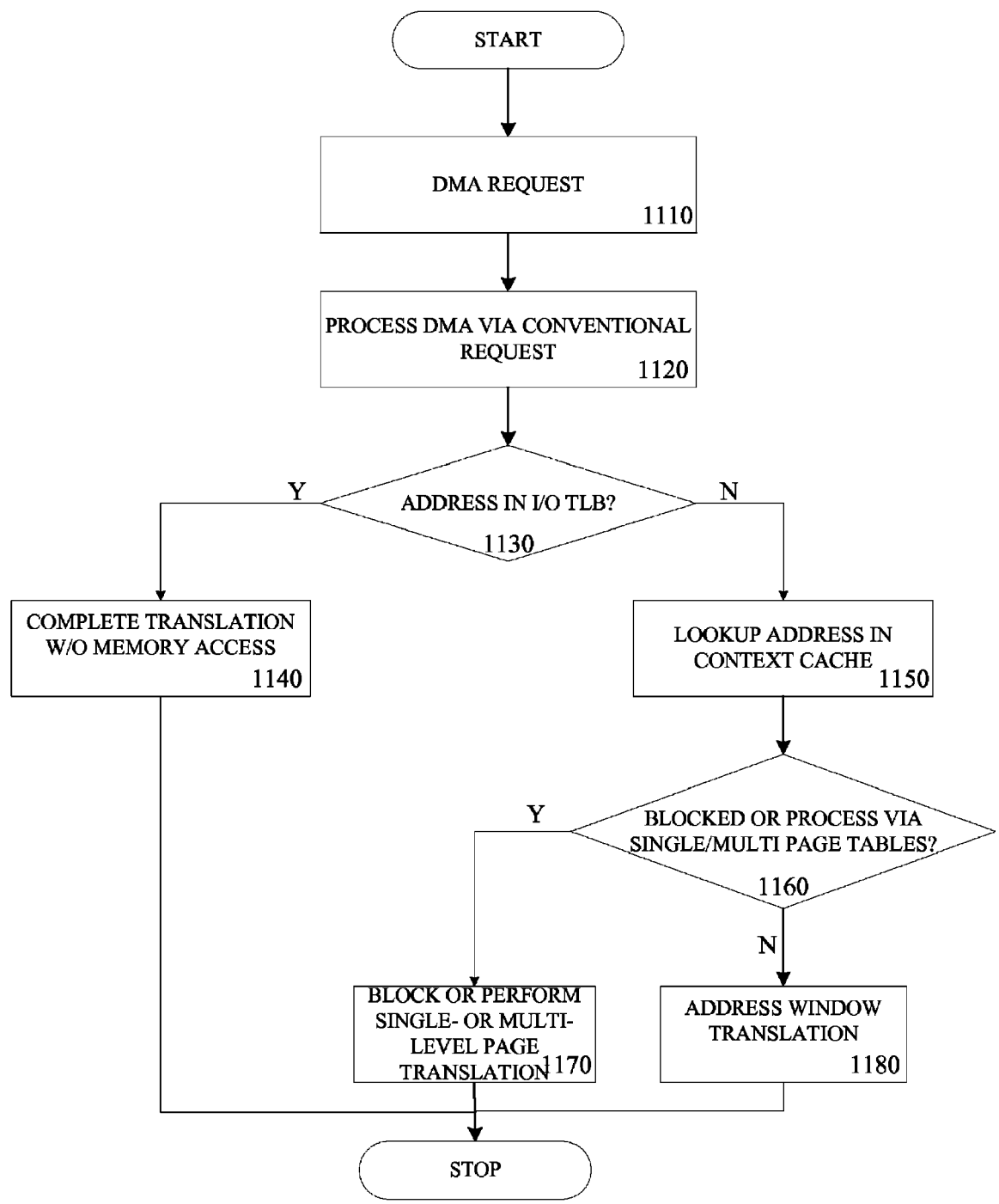
FIG. 11 illustrates a flow diagram for one embodiment of DMA translation.

As discussed above, remapping circuits 135 performs address window based translation in addition to single and multi-level page-table based address translation. FIG. 11 is a flow diagram illustrating one embodiment of the operation of a remapping circuit 135 performing address window based translation, and single and multi-level page-table based address translation.

At processing block 1110, an I/O device generates a DMA request. At processing block 1120, the DMA-request is processed conventionally via a remapping circuit 135. At decision block 1130, it is determined whether a translation for the address specified in the DMA request (e.g., tagged with the device-id in the transaction) is found in the I/O TLB. If the translation for the address specified in the DMA request is found in the I/O TLB, the translation is completed without any memory access, processing block 1140. This includes DMA that may be translated using single- or multi-level page-tables or through address windows.

If the translation for the address specified in the DMA request is not found in the I/O TLB (e.g., miss detected), the context-cache is looked up to determine the translation behavior for the device, processing block 1150. At decision block 1160, it is determined whether the translation is to be blocked or processed through single-level or multi-level page-tables. If the translation is to be blocked or processed through single-level or multi-level page-tables, the request is processed as described in the conventional remapping circuit 135 architecture described above with respect to FIGS. 1-5, processing block 1170. However, if the translation is not to be blocked or processed through single-level or multi-level page-tables, the context-entry for the device specifies address window based translation. Consequently, address window based translation is performed as discussed above with respect to FIG. 7, processing block 1180.

Figure 12:
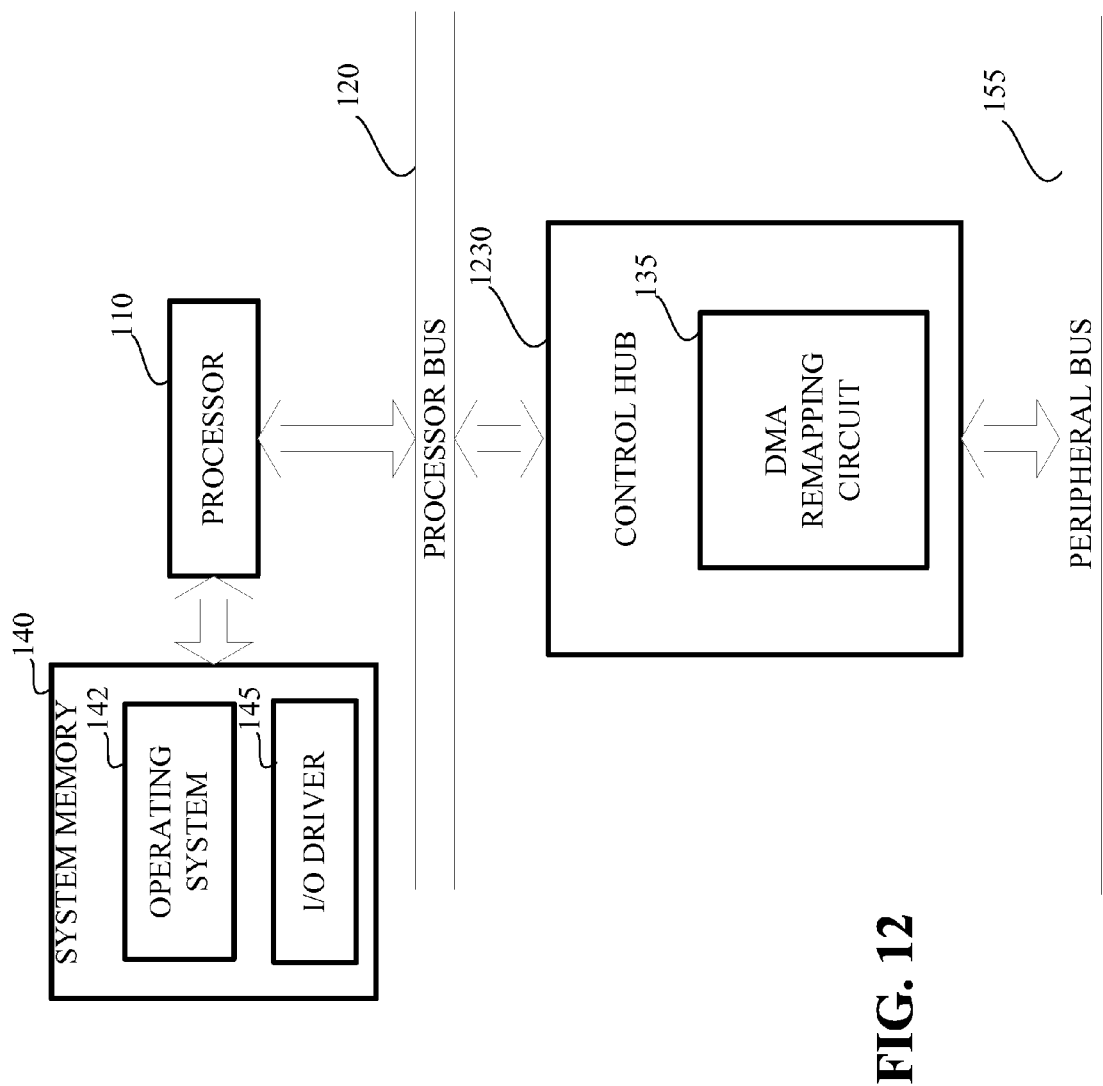
FIG. 12 illustrates another embodiment of a computer system.

FIG. 12 illustrates another embodiment of computer system 100. In this embodiment, the chipset includes a single control hub 1230 as opposed to a separate MCH and ICH. In addition, memory control is located in processor 110. Consequently, system memory 140 is coupled to processor 110. In one embodiment, the remapping circuit 135 is included in the controller hub 1230. In another embodiment, remapping circuit 135 is included in processor 110 or in the system memory 140.

The above described remapping architecture enables 4K granular DMA address translations similar to multi-level page-tables, and yet offers a worst case performance guarantee which is limited to the overheads associated with a single memory lookup.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer hardware apparatus to receive a direct memory access (DMA) request from an input/output (IO) device, the computer hardware apparatus comprising:

an input/output memory management unit (IOMMU) coupled to a Virtual Machine Monitor (VMM), the IOMMU including:
a hardware DMA remapping circuit to:
assign the IO device to a specific guest virtual machine (VM) domain; and
provide an address translation for the DMA request via a DMA remapping structure including an address window (AW), address window page tables (AWPTs), and an address window pointer table (AWPTR) associated with the specific guest VM domain;
an input/output translation lookaside buffer (IOTLB) to cache the address translation associated with the specific guest virtual machine domain;
a logic to determine from the access request whether the address translation for the access request exists in the IOTLB; and
a context-cache for further determining the address translation if the logic determined the access request is non-existent in the IOTLB,
wherein the hardware DMA remapping circuit to provide the address translation for the DMA request based, at least in part, on the AWPTs and the IOTLB, and based on determining whether the address translation exists in the IOTLB, and wherein the hardware DMA remapping circuit to provide the address translation for the DMA request for the address of the IO device to be directly mapped to a respective guest VM via the hardware DMA remapping circuit.

2. The computer hardware apparatus of claim 1, wherein the address translation comprises a translation from a guest physical address (GPA) to a host physical address (HPA).

3. The computer hardware apparatus of claim 1, wherein the IO device is uniquely identifiable through a combination of a bus number, a device number, and a function number.

4. The computer hardware apparatus of claim 1, wherein the hardware DMA remapping circuit includes a register set to provide control or status information to a storage unit.

5. The computer hardware apparatus of claim 1, wherein the hardware DMA remapping circuit is operable, independent of trapping to the VMM, to directly map the IO device to the specific VM domain by running a driver of the IO device only in the VM.

6. The computer hardware apparatus of claim 1 further comprises a second hardware DMA remapping circuit to perform independently of the other hardware DMA remapping circuit.

7. The computer hardware apparatus of claim 1 further comprises an IO controller to receive the DMA request from the IO device, wherein the IOMMU is coupled to the IO controller.

8. The computer hardware apparatus of claim 1, wherein the hardware DMA remapping circuit is operable to process the DMA request if the translation is to be blocked pr processed through single-level or multi-level page-tables.

* * * * *

UNITED STATES PATENT AND TRADEMARK OFFICE
CERTIFICATE OF CORRECTION

PATENT NO. : 7,984,203 B2  Page 1 of 1
APPLICATION NO. : 12/648461
DATED : July 19, 2011
INVENTOR(S) : Rajesh Madukkarumukumana et al.

It is certified that error appears in the above-identified patent and that said Letters Patent is hereby corrected as shown below:

On the Title page, item 75, line 2, inventor "Udo A. Steinburg" should read --Udo A. Steinberg--.

Signed and Sealed this
Fifteenth Day of May, 2012

David J. Kappos
*Director of the United States Patent and Trademark Office*